United States Patent [19]

Pohl

[11] Patent Number: 5,298,102

[45] Date of Patent: Mar. 29, 1994

[54] EXPANDING PRESSURE CHAMBER FOR BONDING SKINS TO FLAT AND SHAPED ARTICLES

[75] Inventor: Andrew P. Pohl, Virginia Beach, Va.

[73] Assignee: Sorbilite Inc., Virginia Beach, Va.

[21] Appl. No.: 2,376

[22] Filed: Jan. 8, 1993

[51] Int. Cl.⁵ .............................................. B29C 65/00
[52] U.S. Cl. ..................................... 156/285; 156/382; 156/493; 156/583.3; 264/313; 425/405.1
[58] Field of Search ............ 156/285, 382, 493, 583.3; 425/405.1; 264/313, 314

[56] References Cited

U.S. PATENT DOCUMENTS

| | | | |
|---|---|---|---|
| 271,494 | 1/1883 | McClelland | 156/493 |
| 1,884,529 | 10/1932 | Benner et al. | 264/314 |
| 2,268,262 | 12/1941 | Miller | 156/583.3 |
| 2,433,094 | 12/1947 | Crowley | 156/382 |
| 2,960,147 | 11/1960 | Ferrell | 156/583.3 |
| 4,155,795 | 5/1979 | Torbet et al. | 156/382 |
| 4,350,545 | 9/1982 | Garabedian | 156/382 |
| 4,828,639 | 5/1989 | Aker et al. | 156/382 |
| 5,176,777 | 1/1993 | Guilhem | 264/314 |
| 5,236,658 | 8/1993 | Ford | 425/405.1 |

Primary Examiner—David A. Simmons
Assistant Examiner—William J. Matney, Jr.
Attorney, Agent, or Firm—Wegner, Cantor, Mueller & Player

[57] ABSTRACT

An apparatus and method for forming and bonding skins to shaped articles includes a first sleeve having an open top end and a lower end closed by a bottom plate, a second sleeve having an open top end and a lower second end which is slidable arranged, and coaxially connected, with the top end of the first sleeve, a top plate, and a forming medium. The forming medium may be an elastic medium, a fluid, or a plurality of low-friction particles, and may be covered by a flexible open pore sponge blanket. The shaped article and the laminate skin to be bonded thereto are placed on the forming medium within a space defined in part by the second sleeve, and the forming medium is pressurized so as to cause the skin to form and bond to the shaped article.

10 Claims, 3 Drawing Sheets

EXPANDING PRESSURE CHAMBER FOR BONDING SKINS TO FLAT AND SHAPED ARTICLES

BACKGROUND OF THE INVENTION

The invention relates to a method and apparatus for forming and bonding decorative skins such as wood veneers and metal foils, as well as synthetic and natural laminates, over shaped articles. According to the prior art, this is achieved by one of three methods. The first method, "profile wrapping", uses a number of rollers which roll the skins onto the shaped article. However, this method is undesirable since the physical details of the shaped article over which the skin is formed are limited depending upon the diameter of the rollers. In addition, this type of equipment is extremely expensive and service intensive.

The second type of prior art method involves the use of a membrane press. In this method, a rubber sheet is stretched over the mouth of a high pressure press. After the press is closed, a gas chamber behind the rubber sheet is pressurized with air, water, or oil, thus forcing the membrane to form to the shape of the shaped article. Although this method allows the laminate to conform to smaller details of the shaped article than possible with profile wrapping, this method is limited to a maximum pressure of around 10 bars. In addition, the membrane press is a very dangerous piece of equipment since the rubber sheet can potentially rupture if the pressure in the gas chamber exceeds the closing power of the press, or if the shaped article has sharp corners. When hot oil is used in the device, the prospect of rupture of the rubber membrane is especially dangerous.

The third type of prior art method involves the use of a piston type pressure chamber. In this method, a piston pushes the article and decorative skin laminate into a forming-medium. The forming-medium then forces the laminate onto the article. Although this method is successful, the charging of the chamber and the pressurizing of the piston are complicated and slow. Further, the steps of heating and cooling the decorative laminate in the chamber are time consuming and energy intensive.

SUMMARY OF THE INVENTION

The apparatus and method of the present invention overcomes various disadvantages of the prior art by facilitating the charging of the chamber, shortening the length of the pressurization stroke and improving the efficiently of the energy intensive step of heating, as well as shortening the duration of both the step of heating and the step of cooling.

An advantage of the present invention is that the apparatus facilitates loading of the chamber by having a top loading surface which is flat and easily accessible from a coplanar work surface. Prior art apparatuses often have high obstructing chamber walls which force an operator to hand load articles into the chamber for processing. Thus, it is possible with the present invention to replace the prior art hand loading with automatic loading by the use of a loading-belt. A further benefit of the invention is that the loading-belt can be designed to provide thermal energy conserving attributes. A further benefit of the invention is the permanent positioning of the loading-belt device on the press. This is in contradistinction to other systems wherein loading devices had to be removed from the press, in part or in whole, in order to clear the loading surface of the press for operation.

Another advantage of the present invention is that the apparatus does not require a complicated piston but merely a flat top press plate having a relatively short scaler stroke. In contrast, the accurate fitting pistons of the prior art have had to extend fairly deeply into the chamber in order to have sufficient guidance. Further, the present invention can be retrofitted into existing standard presses so as to convert them into forming medium presses.

A further advantage of the present invention becomes apparent with respect to the necessary steps of heating and cooling the decorative laminate skins. Considering the fact that articles to be covered with thermoplastic laminates must first be heated to the softening point of the laminate for forming and then cooled to room temperature, the necessity has previously existed to heat and subsequently cool the forming medium, in whole or in part. If the whole mass of forming medium is heated and cooled, very long process times are required and considerable thermal energy must be expended. If only the top surface of the medium is heated this portion necessarily tends to cool to the temperature of the bulk mass of the medium because it moves about within the press due to the displacement which occurs during the step of pressurization. As the article and chamber become larger, the high temperature top surface of the forming medium becomes subject to greater displacement and consequently greater thermal loss. All these drawbacks of the old systems are eliminated with the new invention in that a single or multiple element heater plate can be fitted to an external planar work surface that remains coplanar with the nonpressurized top level of the forming medium. Thus, thermoplastic laminates can be heated together with the article to be coated on these heater work place tables and after softening they can be slid quickly onto the top surface of the relatively cool forming medium and pressed before the laminate cools. The advantageous short stroke fast closing system of the present invention first submerges the laminate article package into the forming medium. The forming medium first acts as a hydraulic fluid to lift a telescopic top frame, which acts to seal the pressure chamber. Further increasing the pressure causes the forming medium to flow within the closed pressure chamber and complete the same process carried out by the piston type—high chamber wall system—but without the involvement of the above mentioned difficulties.

Thus, the invention utilizes shorter heating and cooling cycles than the prior art devices. Moreover, when an elastic medium is used as the forming medium in the pressure chamber, the potential hazard in the event of a structural failure is greatly reduced since there is no liquid or gas to escape. Also, although a membrane is not required, unlike the prior art, the device of the invention can operate with a membrane that is punctured, cut, or otherwise damaged.

The device of the invention includes top and bottom sleeves having a round or other shape which are filled with a forming medium. The forming medium may be a soft synthetic or natural elastomer, a dough-like material, small round balls, or other low friction particles. As a result of the pressure created in the forming medium by the closing of the press, the forming medium flows and conforms to the surface of the shaped article, filling even the finest cavities, pressing before it the prepositioned laminate skin or foil. Assuming the laminate skin or foil has been pre-treated with glue, the laminate and shaped article are then permanently joined.

DETAILED DESCRIPTION

A preferred embodiment of the invention will now be described in detail with reference to the above figures. The stages of the forming process are shown sequentially in FIGS. 1-5.

There are three major steps to completing this type of forming process. First, the article and laminate skin are loaded into the pressure chamber, the pressure chamber is sealed and the article is submerged into the forming medium along with the laminate. Second, the pressure within the chamber is increased until the forming medium forces the laminate into the cavities. Third, the pressure is released, the chamber is opened and the coated article is removed from the chamber.

Figure 1:
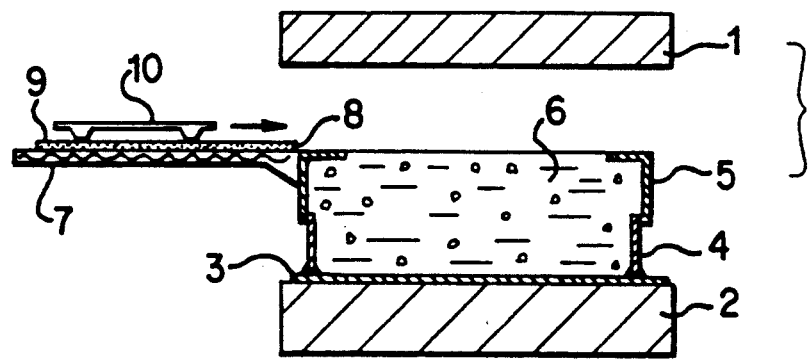
FIG. 1 shows a cross-sectional view of the device of the invention according to a first embodiment.

FIG. 1 shows a cross-section of a forming apparatus according to the invention. Top plate (1) is made out of any material and should be designed to withstand at least a 50 bar load. Sleeves (4) and (5) are preferably made out of steel and formed so as to movably slide within one another. Sleeve (4) is welded to the bottom plate (3) to contain the elastic forming medium (6) in the volume defined by the bottom plate (3) and the sleeves (4) and (5). Bottom plate (3) rests on base (2). The top shoulder of sleeve (5) is substantially coplanar with the base (2) and is called a telescopic top frame. It rides on the top surface of the forming medium (6). If the forming medium (6) rises up due to an article being submerged in it, the telescopic top frame is automatically lifted until equilibrium occurs. If the telescopic top frame is lifted high enough to contact the bottom surface of top plate (1) the pressure chamber will be sealed.

The device according to the present invention uses the principle of a pressurized viscous medium seeking to deform and flow toward an area of lower resistance. By submerging an article into the flat top surface of the forming medium in the pressure chamber and applying external pressure, the forming medium moves toward the easiest escapeway and lifts the telescopic top frame which is riding partially on the forming medium. By lifting the telescopic top frame into contact with the top plate, the chamber is sealed and the only escape path remaining for the pressurized forming medium to follow is intrusion into the cavities of the article.

The forming medium (6) may be an elastic material. The forming medium (6) may be any type of unvulcanized rubber compound of natural or synthetic composition, modelling clay (preferably synthetic compositions), synthetic beads such as LUBRA-GLIDE® (LUBRA-GLIDE® is a trademark of Sun Drilling Products Corp., New Orleans, La.), or ceramic, steel, or plastic balls. At low pressures, even agricultural seeds such as rice and corn work satisfactorily. In the case of using the above-mentioned ball like gliding components, the top surface of the chamber is preferably covered with an elastic skin.

Exemplary work piece (10) is a raised wooden panel door which is placed on a skin (9) which has been pre-treated with a glue. Of course, work piece (10) could be any shaped substrate, and skin (9) could be any molding laminate. Because of the containment of the elastic medium, the molding process occurs automatically upon closing the press. As discussed previously, in a direct automation, a heated loading belt can move the various components in and out of the press area defined by 1 and 2. Different shapes and different skins require different pressure settings for optimum molding, and thus pressure settings and temperatures may be varied by varying the hydraulic pressure of the press as well as the process temperatures.

A heated loading work platform (7) is fitted to sleeve (5) and is arranged so at to always remain at the same level as the top of the forming medium. Thus, a loading belt (8) can be fitted onto the top of the platform (7) so as to slide in and out together with the laminate (9) and article (10). The loading belt (8) may be made of any synthetic or natural rubber, preferably silicon, neoprene or EPDM (a terpolymer of ethylene, propylene and a small amount of a non-conjugated cyclic or aliphatic diene) and can be heated to temperatures corresponding with the softening point of the laminate (9).

Figure 6:
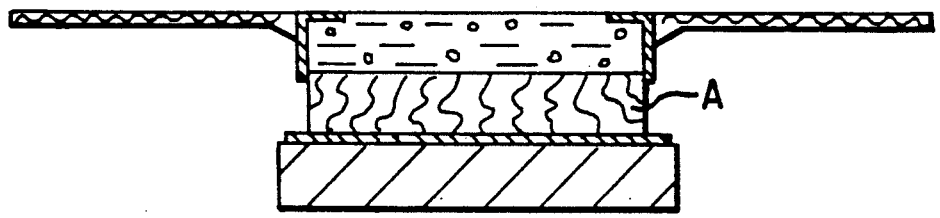
FIG. 6 shows a cross-sectional view of the device of the invention according to a second embodiment with multiple heater work places and a bottom compression block.

When using the apparatus to form thermoplastic or thermosetting skins, the plastic skin must be heated to a predetermined temperature and kept at this temperature until the end of the forming process. After the forming process, the skin must be cooled until it is sufficiently rigid to remove it from the press. The device of this invention performs this function without lifting the product, the laminate or the blanket (loading belt) as required by previous constructions. Further automation is shown in FIG. 6 where multiple heated loading tables are fitted to the expanding pressure chamber. During the forming cycle, the next batch is advantageously preheated. If a continuous loading belt is used, as soon as the press is opened the same belt can dispatch the outgoing finished goods and draw the next batch in.

A preheated thermoplastic laminate skin from the loading belt will cool on the relatively cool pressure forming medium quickly. So the compression step can simultaneously be the cooling step. Considerable energy savings and extremely short press cycles such as 1 minute or less are thereby readily achievable. Where the workpiece requires coating on both sides, the apparatus can be adapted to perform this operation by placing a top skin and a top flexible blanket over the workpiece.

In contrast, the prior art devices discussed above are running on cycles of 10 minutes or longer using two sets of high quality flexible blankets which need to be preheated outside of the apparatus by means of a contact heater, radiator, or microwave. Prior to forming, one of the prior art heated blankets is placed in position together with the coating skin. This blanket, which is an insulator and thus requires a long time to transfer temperature, holds the temperature sufficiently during the forming cycle to enable forming and subsequently cools to a necessary ejection temperature. After the press is opened, the cold blanket goes back to the heater and the second, hot blanket completes the next cycle. Thus, the method of the present invention allows the usual prior art cycles of 12 to 20 minutes to be cut to only 1 minute and further eliminates problems associated with blowing hot air or feeding hot oil to the laminate skin to keep it hot, as well as eliminating problems associated with the cooling process.

The forming medium, which can be elastic, can be covered with one or more high quality flexible blankets which can be heated. The blankets may be made of any synthetic or natural rubber, but preferably silicon, neoprene, EPDM, or VITON® (VITON® is a trademark of DuPont Polymers, Wilmington, Del. for copolymers of vinylidene fluoride and hexafluoropropylene). The rubber compounds can be filled with conductive metal powder of high resistance so that the blankets made therefrom will be heated when current is passed therethrough. Polypropylene, polymers of halogenated unsaturated hydrocarbons, such as polytetrafluoroethylene (TEFLON®), and other stretchable films may also be used for the blanket (8), but since these films do not return to their original shape they must be replaced after every pressing.

As noted above, any low friction particle may be used in the device of the invention, including (referring to FIG. 4) steel, plastic, and glass balls, heavy and light viscosity fluid and low-friction solid particles. When small particles are used, it is preferred that the molding chamber be separated by a flexible blanket under which the low friction particles are placed. However, in cases where the particles are big enough that they cannot flow behind the laminate skin to be molded, the flexible blanket can be eliminated.

Figure 2:
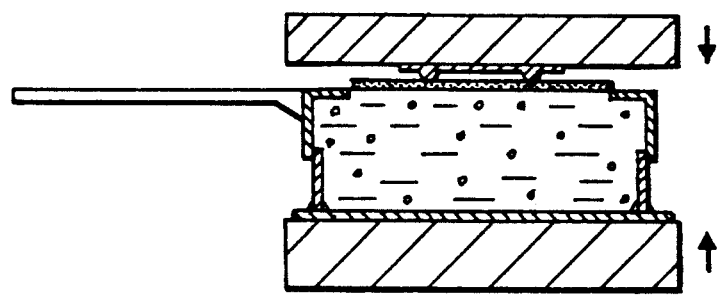
FIG. 2 shows a cross-sectional view of the apparatus of FIG. 1 after the press has been closed to an initial degree.

FIG. 2 shows the stage of closing where the top plate has reached contact with the article, which is sitting on the previously preheated laminate. The preheated laminate is sitting on top of the loading belt which is in turn sitting on top of the forming medium which can advantageously be maintained at a temperature lower than that of the preheated laminate.

Figure 3:
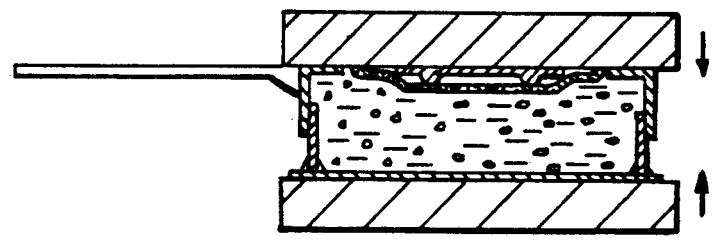
FIG. 3 shows a cross-sectional view of the apparatus of FIG. 1 wherein the telescopic top frame has sealed the chamber.

FIG. 3 shows the stage where the article has been submerged into the forming medium. The displaced forming medium pushes the top telescopic frame against the top plate so as to seal the pressure chamber.

Figure 4:
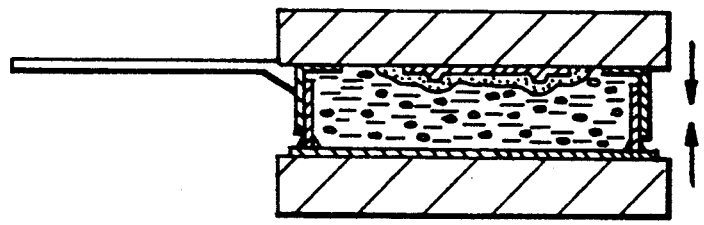
FIG. 4 shows a cross-sectional view of the apparatus of FIG. 1 after completing a forming process.

FIG. 4 shows the last stage of the compression cycle. The forming medium has pushed the laminate into position which is frozen through the contact with the forming medium which can absorb thermal energy from the laminate and article.

Figure 5:
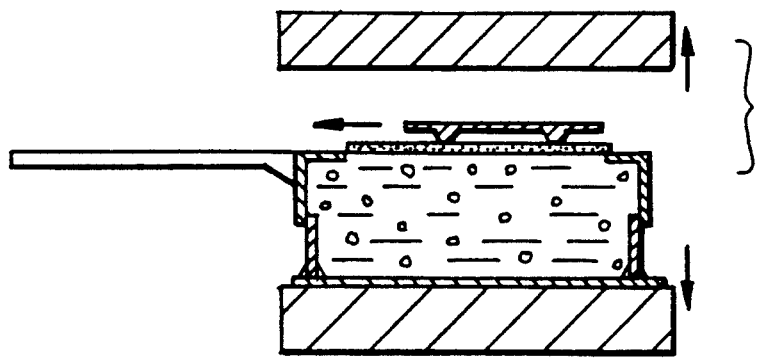
FIG. 5 shows a cross-sectional view of the apparatus of FIG. 1 after opening the press chamber and removing the coated article.

FIG. 5 shows the finished work piece ready for ejection from the apparatus. The ready product is again on the level of the heater table and can be slid out without complication.

FIG. 6 shows the device with multiple temperature controllable work tables. The bottom section of the device is also replaced with a block representing an alternative to a first sleeve connected to a bottom plate.

Figure 7:
FIG. 7 shows a cross-sectional view of a vacuum release membrane according to the invention.

FIG. 7 shows the top surface of the forming medium. One of the biggest problems during the forming process is created due to the presence of entrapped air in the cavities during the press cycle and vacuums formed after the completed process. The old systems use vacuum pumps to remove air before the pressing and compressed air blown between the product and the membrane after the cycle. The device of the present invention is capable of working with a micro punctured thin loading belt and an open cell sponge blanket which functions to close the top surface of the forming medium. This configuration lets air freely flow through, eliminating the need for vacuum pumps or compressors while simultaneously reducing the required process time. Thus the present invention substantially increases efficiency. Note that during the compression stage this open pore sponge blanket is firm enough to form the laminate accurately.

Figure 8:
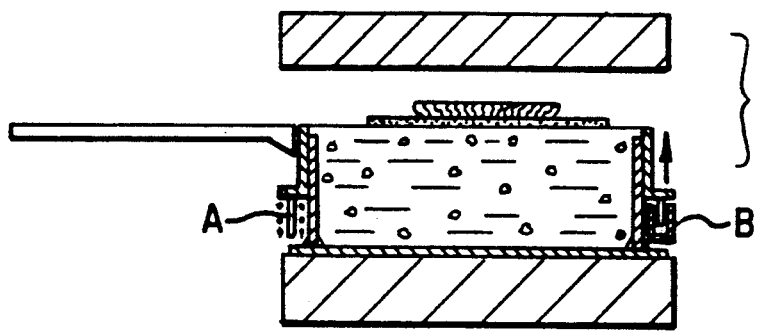
FIG. 8 shows a cross-sectional view of the device of the invention according to a third embodiment.

FIG. 8 is an alternative to the embodiment shown in FIG. 1. In FIG. 8 the telescopic top frame is not actuated by the forming medium but by another mechanical or electrical means.

Figure 9:
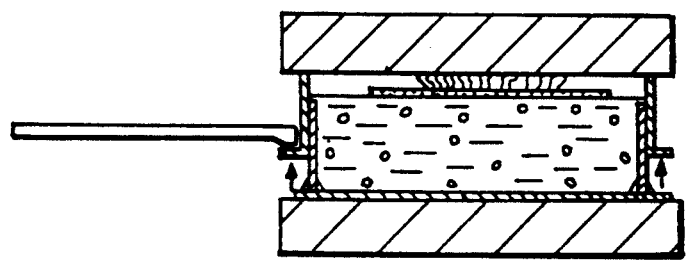
FIG. 9 shows a cross-sectional view of the device of the invention according to a fourth embodiment.
Figure 10:
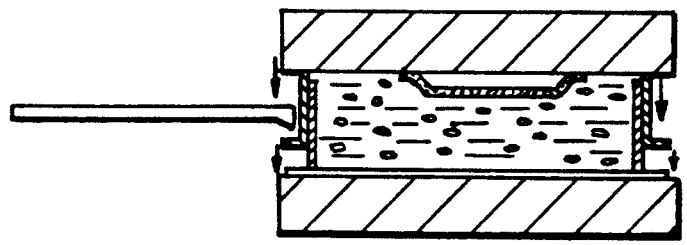
FIG. 10 shows a cross-sectional view of the apparatus of FIG. 9 in a position of final pressurization.

FIGS. 9 and 10 show the characteristic closing and compression steps of the invention. These figures show alternative device designs.

While there are shown and described present embodiments of the invention, it is to be distinctly understood that the invention is not limited thereto, but may be otherwise variously embodied and practiced within the scope of the following claims.

What is claimed is:

1. An apparatus for forming and bonding skins to shaped articles, comprising:
    a first sleeve having two ends, said first sleeve being open at a first end and closed at a second end by a bottom plate;
    a second sleeve having two ends, said second sleeve being open at a first end and slidable and coaxially connected with said first sleeve at a second end;
    forming and bonding means comprising a forming medium, having a nonpressurized substantially horizontal top level, disposed within said first sleeve and said second sleeve, for forming and bonding a skin to a shaped article; and
    a top plate movable into pressurized engagement with said first end of said second sleeve, whereby said top plate fits tightly against and seals said first end of said sleeve so as to pressurize the forming medium.

2. Apparatus as claimed in claim 1, further comprising at least one temperature controllable work table which is substantially coplanar with said nonpressurized substantially horizontal top level of said forming medium.

3. Apparatus as claimed in claim 1, further comprising means for moving said first end of said second sleeve into pressurized engagement with said top plate.

4. Apparatus as claimed in claim 1, wherein said forming medium returns to said nonpressurized substantially horizontal top level after every operating cycle.

5. Apparatus as claimed in claim 1, wherein said forming medium is an elastic medium.

6. Apparatus as claimed in claim 1, wherein said forming medium is a plurality of low-friction particles.

7. Apparatus as claimed in claim 1, wherein said forming medium is a fluid covered with a leak-proof elastic blanket.

8. Apparatus as claimed in claim 1, wherein said forming medium is covered with a open cell sponge blanket.

9. A method for forming and bonding skins to a shaped article, comprising the steps of:
providing an apparatus for forming and bonding skins to shaped articles, comprising
a first sleeve having two ends, said first sleeve being open at a first end and closed at a second end by a bottom plate,
a second sleeve having two ends, said second sleeve being open at a first end, and slidable and coaxially connected with said first sleeve at a second end,
a forming and bonding means comprising a forming medium, having a nonpressurized substantially horizontal top level, disposed within said first sleeve and said second sleeve, for forming and bonding a skin to a shaped article,
a top plate movable into pressurized engagement with said first end of said second sleeve, whereby said top plate fits tightly against and seals said first end of said sleeve so as to pressurize the forming medium, and
at least one temperature controllable work table which is substantially coplanar with said nonpressurized substantially horizontal top level of said forming medium;
placing a laminate skin on said at least one temperature controllable work table;
placing a shaped article on said laminate skin;
providing a predetermined amount of thermal energy to soften said laminate skin;
moving said laminate skin and the shaped article on top of said forming medium;
moving said top plate into pressurized engagement with said first end of said second sleeve, whereby said top plate fits tightly against and seals said first end of said sleeve; and
pressurizing the forming medium so that the laminate skin is formed and bonded to the shaped article by the forming medium,
wherein the forming medium is capable of absorbing thermal energy from said laminate skin.

10. A method as claimed in claim 9, further comprising the step of:
providing at least one open cell sponge blanket on said nonpressurized substantially horizontal top level of said forming medium,
wherein the step of moving said laminate skin and the shaped article on top of said forming medium is a step of moving said laminate skin and the shaped article onto the at least one open cell sponge blanket.

* * * * *